United States Patent [19]

Pueschel et al.

[11] Patent Number: 5,727,852
[45] Date of Patent: Mar. 17, 1998

[54] METHOD AND DEVICE FOR CONTROLLING AN ABS ANTILOCK BRAKING / ASR TRACTION CONTROL SYSTEM

[75] Inventors: Helmut Pueschel, Marbach; Guenther Schmidt, Tamm; Manfred Gerdes, Korntal-Muenchingen, all of Germany

[73] Assignee: Robert Bosch GmbH, Stuttgart, Germany

[21] Appl. No.: 586,137

[22] Filed: Jan. 16, 1996

[30] Foreign Application Priority Data

Jan. 21, 1995 [DE] Germany ............ 195 01 760.9

[51] Int. Cl.[6] .................................................. B60T 8/34
[52] U.S. Cl. .................................................. 303/113.4
[58] Field of Search .................... 303/113.2, 113.4, 303/116.1, 119.1, 113.5, 115.2, DIG. 3, DIG. 4

[56] References Cited

U.S. PATENT DOCUMENTS

| | | |
|---|---|---|
| 5,169,214 | 12/1992 | Holzmann et al. |
| 5,188,437 | 2/1993 | Willmann ............ 303/DIG. 4 |
| 5,205,623 | 4/1993 | Holzmann et al. |
| 5,236,256 | 8/1993 | Schmidt ............ 303/DIG. 4 |
| 5,246,280 | 9/1993 | Sigl ............ 303/DIG. 4 |
| 5,401,083 | 3/1995 | Altmann ............ 303/113.4 |
| 5,445,444 | 8/1995 | Rump ............ 303/113.4 |
| 5,496,099 | 3/1996 | Resch ............ 303/113.4 |

FOREIGN PATENT DOCUMENTS

| | | |
|---|---|---|
| 0482379 | 4/1992 | European Pat. Off. |
| 40 35 527 | 5/1992 | Germany . |
| 4102497 | 5/1992 | Germany . |
| 4329140 | 12/1994 | Germany . |
| 2250070 | 5/1992 | United Kingdom . |
| 2252373 | 8/1992 | United Kingdom . |
| 2253254 | 9/1992 | United Kingdom . |
| 2281364 | 1/1995 | United Kingdom . |

*Primary Examiner*—Robert J. Oberleitner
*Assistant Examiner*—C. T. Bartz
*Attorney, Agent, or Firm*—Kenyon & Kenyon

[57] ABSTRACT

A device and a method for controlling an ABS antilock braking/ASR traction control system include a return pump, at least one aspirator valve (ASV), and at least one switch-over valve (USV). The return pump, the switch-over valve and/or the aspirator valve are triggered at least in dependence upon one signal which represents the actuation of the brake pedal.

9 Claims, 7 Drawing Sheets

Fig. 8 ism of FIG. 1.

METHOD AND DEVICE FOR CONTROLLING AN ABS ANTILOCK BRAKING / ASR TRACTION CONTROL SYSTEM

BACKGROUND INFORMATION

German Patent Application No. 40 35 527 (corresponding to U.S. Pat. No. 5,205,623), for example, describes a method and system equipped with a master brake cylinder and a vacuum brake booster (not shown) which serves as a power brake unit. Vacuum brake boosters are very expensive, however.

SUMMARY OF THE INVENTION

An object of the present invention is to entirely or partly eliminate the vacuum brake booster.

The method according to the present invention makes it possible to completely or partially replace the vacuum brake booster by a hydraulic power braking. This is achieved in that the return pump of the ABS/ASR (antilock braking/ traction control) hydraulic aggregate actively builds up pressure in the wheel-braking cylinders in dependence upon the driver's wish.

DETAILED DESCRIPTION

Figure 1:
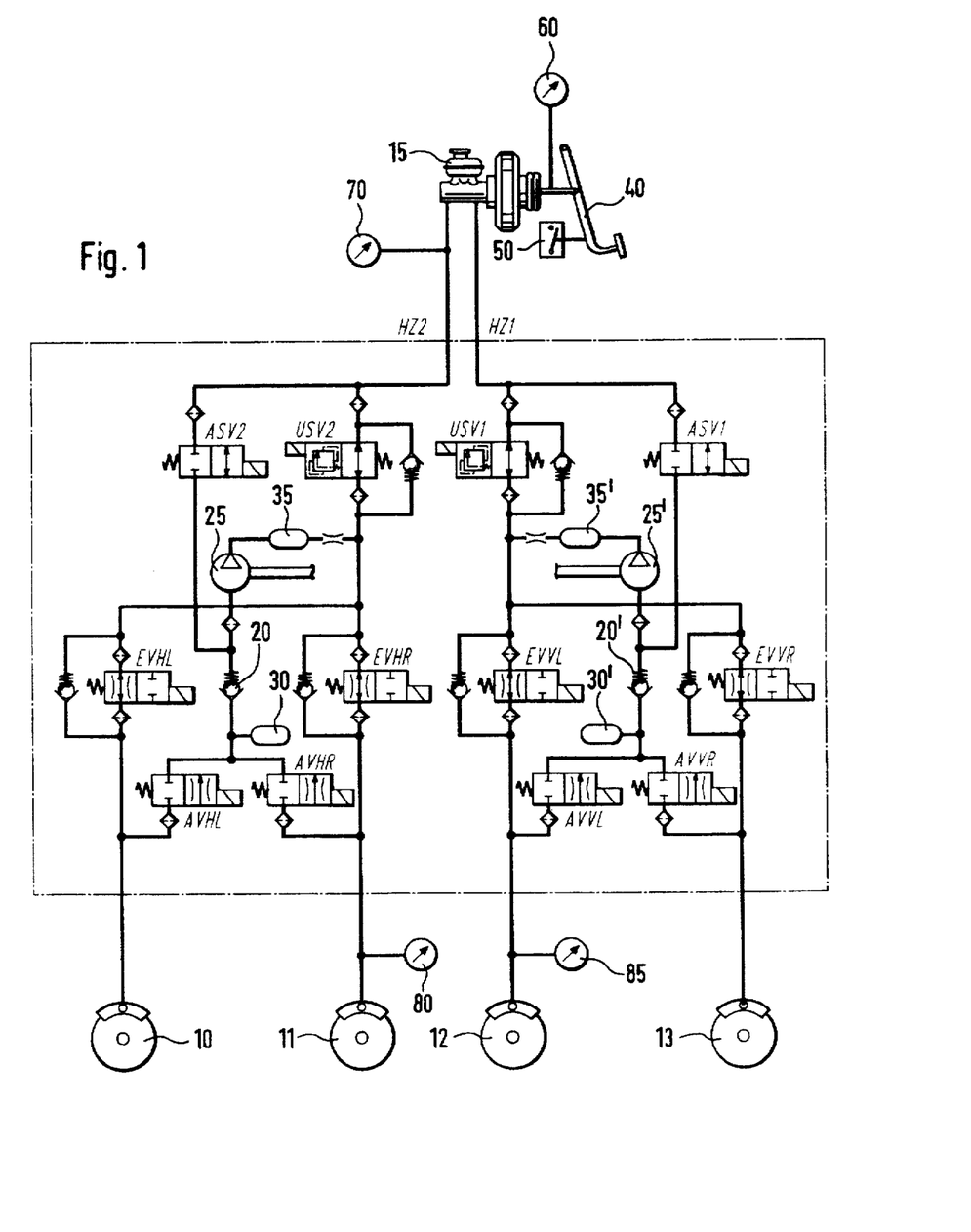
FIG. 1 depicts a block diagram of a braking system.

In FIG. 1, the essential elements are described in the form of a block diagram of a braking system with antilock braking control (ABS) and traction control (ASR). A wheel brake cylinder is allocated to each wheel of the vehicle. The wheel brake cylinder of the rear left wheel is denoted by 10, of the rear right wheel by 11, of the left front wheel by 12, and of the right front wheel by 13.

Each of these wheel brake cylinders 10 through 13 communicates with an outlet valve (AV) as well as with an inlet valve (EV). The outlet valve allocated to the wheel brake cylinder 10 is denoted by AVHL, the outlet valve allocated to the wheel brake cylinder 11 by AVHR, the outlet valve allocated to the wheel brake cylinder 12 by AVVL, and the outlet valve allocated to the wheel brake cylinder 13 by AVVR. The inlet valve allocated to the wheel brake cylinder 10 is denoted by EVHL, the inlet valve allocated to the wheel brake cylinder 11 by EVHR, the inlet valve allocated to the wheel brake cylinder 12 by EVVL, and the inlet valve allocated to the wheel brake cylinder 13 by EVVR.

In their working position brought about by magnetic excitation, the outlet valves connect the wheel brake cylinders via a check (one-way) valve 20 to a return pump 25 or 25'. In their unexcited basic position, they block this connection. Incorporated into the connection between the outlet valves and the return pump is a low-pressure accumulator (reservoir) 30.

In their unexcited basic position, the inlet valves EV render possible an unhindered passage between the wheel brake cylinders and the switch-over valves USV. In the working position brought about by magnetic excitation, the inlet valves EV block this passage. Allocated to two wheel brake cylinders are aspirator valves ASV1 and ASV2, respectively, and switch-over valves USV1 and USV2, respectively. They furnish the braking supply pressure in the event of a traction control (ASR operation).

The switch-over valve USV is disposed in the connecting line between the inlet valves EV and a brake fluid reservoir 15. In their unexcited basic position, the switch-over valves USV1 or USV2 are open. In the unexcited basic position, the aspirator valves are blocked. The aspirator valves ASV are connected between the brake fluid reservoir 15 and the suction-side connection of the return pump and, thus, the outlet valves.

A check valve having a flow-through direction toward the inlet valves EV is connected in parallel to the switch-over valves USV.

A damper (chamber) 35 or 35' is disposed in each case between the delivery-side outlet of the return pump 25 or 25' and the switch-over valves.

A sensor 60, which supplies a signal $S_{PED}$ indicating the driver's wish, is disposed in the area of a gas pedal 40. Also provided is a brake lights switch 50, which activates the brake lights upon actuation of the brakes.

Another sensor 70 is arranged in the line between the master brake cylinder 15 and the switch-over valves USV1 or USV2. This sensor 70 supplies a signal PHZ which characterizes the pressure in the master brake cylinder.

In addition, other sensors 80 and 85 can also be provided, which are disposed in the line between the outlet or inlet valves and the wheel brake cylinders, and supply a signal PRZ1 or PRZ2, which characterizes the pressure in the wheel brake cylinders.

Depending on the specific embodiment, only one or a plurality of the sensors 60, 70, 80 or 85 can be provided.

During normal operation, the solenoid valves are in their unexcited basic position. When the brake pedal is actuated by the driver, the brake fluid flows through the switch-over valve and the inlet valves into the corresponding wheel brake cylinders. If a blocking tendency of a wheel is detected, the corresponding inlet valve is brought into its blocking position and the corresponding outlet valve AV into its working position. In this position, brake fluid is siphoned by the return pump from this wheel brake cylinder.

In ASR (traction control) operation, the aspirator valves ASV and the switch-over valves USV are brought into their working position and the return pumps are activated. By this means, pressure is built up in the wheel brake cylinders for as long as the inlet and outlet valves are in their basic position.

If the inlet valve EV and the outlet valve AV are in their basic position, then pressure is built up in the wheel brake cylinder. If the inlet valve is in its working position and the outlet valve in its neutral position, the pressure prevailing in the wheel brake cylinder remains at a constant value. If the outlet valve AV and the inlet valve EV are in their working position, then pressure is reduced in the wheel brake cylinder.

Figure 2:
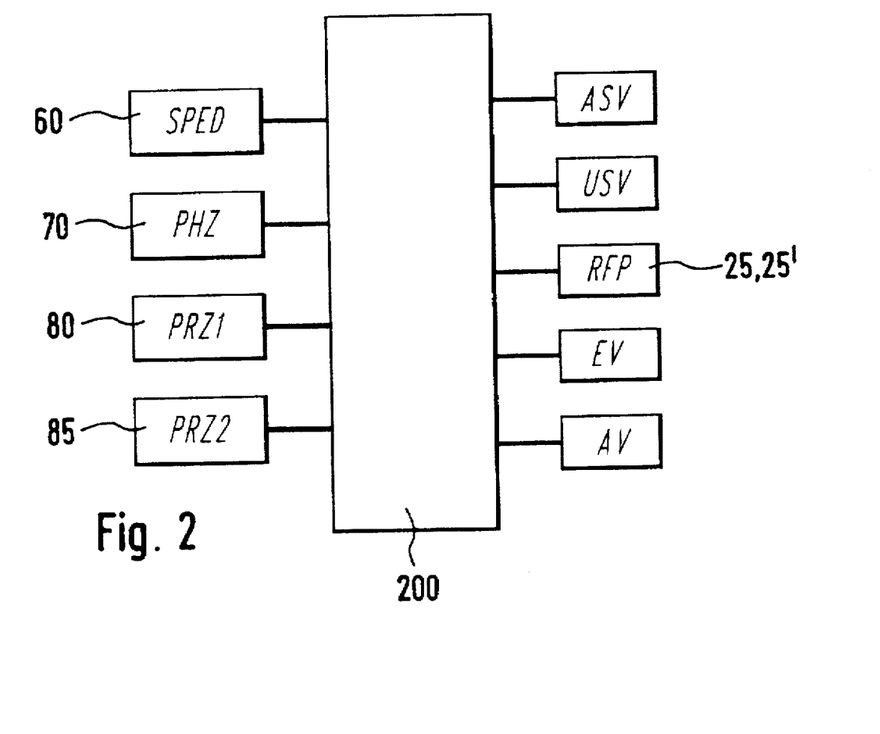
FIG. 2 shows a control unit for controlling the braking system of FIG. 1.

In FIG. 2, 200 denotes a control device, which detects the signals from the various sensors and, on the basis of these signals, depending, for example, on the driver's wish, activates control signals to be received by the inlet valves EV, the outlet valves AV, the return pump or return pumps 25, 25', the switch-over valves USV1, USV2, and the aspirator valves ASV1, ASV2.

Figure 3:
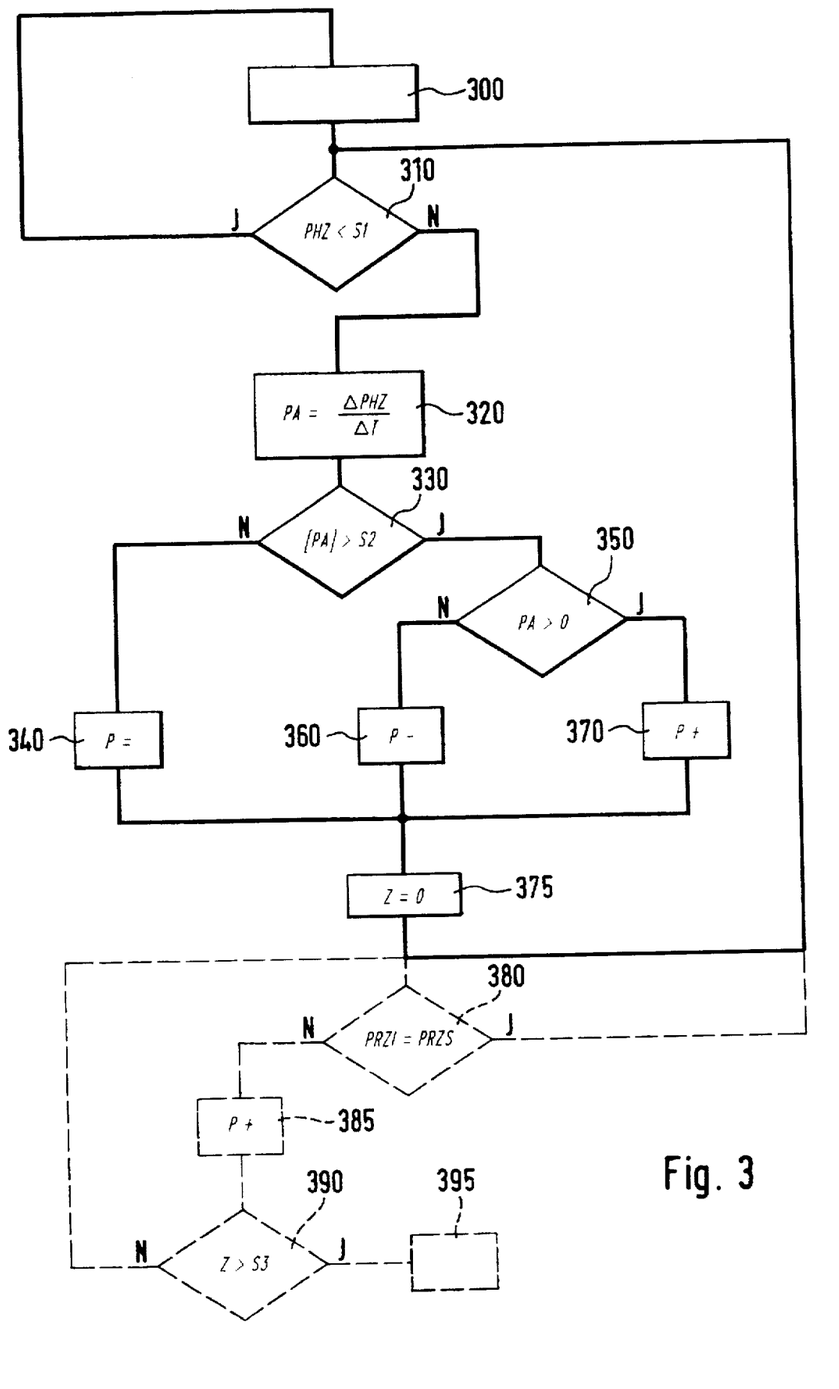
FIG. 3 shows a flow chart for illustrating the method according to the present invention.

The flow chart depicted in FIG. 3 illustrates the functioning of this device. In step 300, an actuation of the brake pedal by the driver is detected. This can follow, for example, through evaluation of the brake lights switch 50. Subsequently, the query 310 checks whether the actuation of the brake pedal has exceeded a specific measure. The exemplary embodiment described in the following provides for a sensor 70 which detects the pressure in the master brake cylinder. If the pressure PHZ in the master brake cylinder 15 is less than a threshold value S1, then the program returns to step 300. During the next program run, the value of the pressure signal PHZ is measured once more, and the query 310 follows again. The pressure signal PHZ is preferably detected with a sampling rate that is less than one ms.

If the query 310 detects that the pressure PHZ is greater than or equal to the threshold value S1, then step 320 follows in which the change PA in the pressure PHZ is determined. To this end, the change in the pressure ΔPHZ is divided by the time span ΔT since the last pressure detection.

The query 330 subsequently checks whether the amount of change in the pressure PA is greater than a second threshold value S2. If this is not the case, it is then recognized in step 340 that the driver does not desire any change in pressure. This means that in step 340, the return pumps and the valves are so triggered that a pressure-sustaining state ensues.

On the other hand, if the query 330 recognizes that the amount PA of the pressure change is greater than the threshold value S2, then the query 350 follows. The query 350 detects whether the change in pressure is greater than 0 or less than 0. When a change in pressure is greater than 0, an increase in pressure is recognized, and when a change is less than 0, a decrease in pressure is recognized.

The return pumps and the valves are so triggered in step 360 that the pressure-reducing state ensues. By this means, the pressure PRZ in the wheel brake cylinder is reduced by a specific amount P−. In step 370, the return pumps and the valves are so triggered that the pressure build-up state ensues. By this means, the pressure PRZ in the wheel brake cylinder is increased by a specific amount P+.

Another specific embodiment of the invention provides for a sensor 60 to be used in place of the pressure sensor 70 to directly detect the actuation of the brake pedal 40. Such a sensor 60 can detect, for example, the pedal travel or the path of the piston for actuating the master brake cylinder or a corresponding variable.

Accordingly, the signals SPED of the sensor 60 are then processed in the flow chart according to FIG. 3, instead of the signals HZ of the sensor 70.

A further specific embodiment can provide for both a sensor 60 to directly detect the pedal travel, as well as a sensor 70 to detect the pressure in the master brake cylinder.

Alternatively to the query 310, it can also be provided to check whether the brake lights switch 50 detects an actuation of the brake pedal.

When a defined threshold of the pressure PHZ prevailing in the master brake cylinder is exceeded, the hydraulic boost is activated by the hydraulic aggregate, and the pressure in the wheel brake cylinders is built up through proper triggering of the return pump and of the valves.

It is particularly advantageous to combine this arrangement with a conventional vacuum brake booster. The boost provided by the hydraulic aggregate can then follow merely within a specific pressure range. Below a specific pressure threshold, which preferably lies at 30 bar, the conventional power brake unit then works alone.

Figure 4:
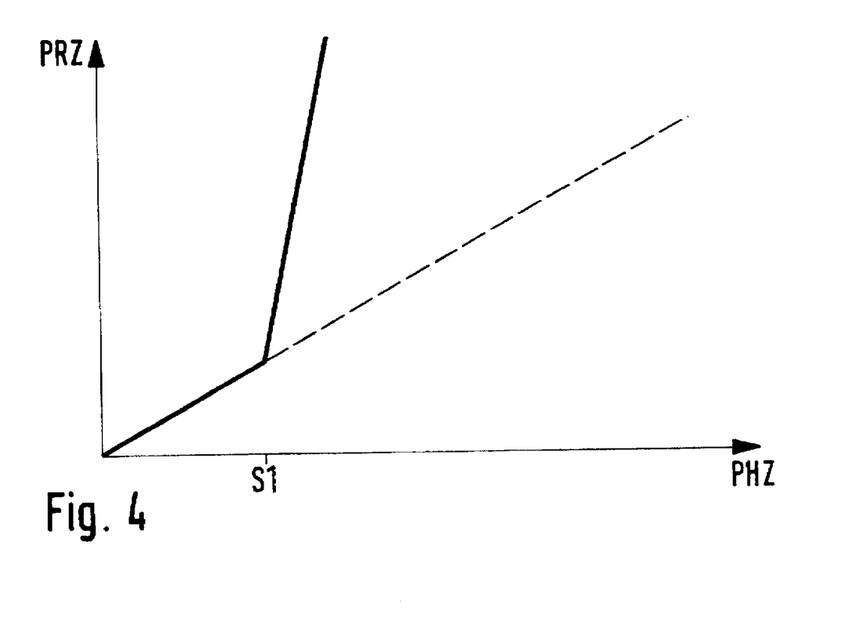
FIG. 4 shows a diagram depicting the interrelation among various pressure signals.

It is especially advantageous for there to be a correlation between the pressure PHZ in the master brake cylinder and the pressure PRZ in the wheel brake cylinder, as shown in FIG. 4. The characteristic curve without a power brake unit is plotted with a dotted line. The correlation with power braking is plotted with a solid line. When pressures prevailing in the master brake cylinder are less than the threshold value S1, the pressure PRZ prevailing in the wheel brake cylinder rises slowly. When the threshold S1 is reached, the pressure PRZ prevailing in the wheel brake cylinder rises very quickly. The rate of rise is dependent upon which amount P− or P+ the pressure PRZ is reduced or increased by in steps 360 or 370.

It is particularly advantageous for the value P+ or P− by which the pressure PRZ is increased or lowered to be proportional to the change in pressure PA in the master brake cylinder.

One especially advantageous refinement is to provide additional sensors 80 or 85 to detect the pressure PRZ prevailing in the wheel brake cylinders. This makes it possible to control the realization of the target values for the pressures in the wheel brake cylinders. By this means, a setpoint value can be specified for the pressure PRZ in steps 340, 360 and 370, in each case the new pressure value being determined from the preceding pressure value by an increase or decrease by a specific value. By comparing the setpoint value for the pressure in the wheel brake cylinder with the actually measured value of the pressure in the wheel brake cylinder, a controlling of the pressure in the wheel brake cylinder is achieved.

This refinement is illustrated with a dotted line in FIG. 3. Following the queries 340, 360 and 370, the query 380 checks whether the pressure PRZI in the wheel brake cylinders measured by the sensors 80 or 85 corresponds to the setpoint value PRZS for the pressure in the wheel brake cylinders. If this is the case, then the query 310 follows once more. If this is not the case, then in dependence upon the operational sign of the deviation from the actual and the setpoint value, in step 385, the solenoid valves or the return pump are controlled in the sense of a pressure increase or a pressure decrease.

A subsequent query 390 checks whether the counter takes on Z values which are greater than a threshold value S3. If this is not the case, then the query 380 follows once more.

Following steps 340, 360 and 370, a counter is set to 0 in step 375.

If the query 390 detects that the threshold value has been exceeded, thus that too many control operations have been performed, then the existence of errors is recognized in step 395. By checking the actual pressure PRZ prevailing in the wheel brake cylinder, a circuit failure can be advantageously detected. If, for example, vapor bubbles occur in one of the wheel brake cylinders, then an appropriate countermeasure is introduced in step 385 through a further pressure increase. An insufficient pressure build-up in a master brake cylinder circuit can be corrected through an active build-up of pressure using the return pump.

If implausible pressure signals exist during braking, this means that the query 380 recognizes that the setpoint value PRZS and the actual value PRZI for the pressure in the wheel brake cylinder do not conform, so that the solenoid valves and the return pump are triggered in the sense of a pressure build-up. In the event of a defect, e.g. a leak in the hydraulic area, there is no change in the measured pressure PRZI, even after repeated triggering of the return pump and of the valves in the sense of a pressure build-up. This is recognized in step 395 by means of the query 350. If the lack of pressure build-up is attributable to vapor bubbles in the master brake cylinder circuit, then this can be compensated by the further build-up of pressure in step 385. If there is a leak, then this is detected in step 395 and, if necessary, signaled to the driver.

By using two sensors 80 and 85 and two return pumps 25 and 25', it is possible, by varying the setpoint selection of a pressure increase, to realize different braking force distributions in the two brake circuits.

To sustain pressure, to build up pressure, or to decrease pressure, different variants are possible for triggering the individual elements. A first specific embodiment provides for the pressure to be built up as follows. The return pumps 25 or 25' are so triggered that they deliver. In addition, the aspirator valves ASV are so triggered that they open. The switch-over valves USV are so triggered that they close. In this type of triggering, the connection between the wheel brake cylinders and the master brake cylinder 15 is eliminated. The return pump 25 delivers the hydraulic fluid via the inlet valves into the wheel brake cylinders; this leads to a build-up of pressure.

The sustain-pressure state is realized as follows. The pump motor is switched off, the aspirator valves are so triggered that they close, and the switch-over valves are so triggered that they remain closed. This leads to no further build-up of pressure by means of the return pump. The pressure remains at its constant value.

To decrease the pressure PRZ in the wheel brake cylinder, the elements are triggered as follows. The pump motor remains switched off. The aspirator valve ASV remains closed. The switch-over valve USV is so triggered that the pressure difference between the pressure PRZ and the pressure PHZ leads to a quasi steady volumetric return flow from the wheel brake cylinders to the master brake cylinder. This can be realized, for example, by triggering the switch-over valve USV with pulse width modulation. This makes it possible for hydraulic fluid to be drained from the wheel brake cylinders to the master brake cylinder. For example, given a cycle time of 10 ms, the switch-over valve is open for 1 to 5 ms.

It is especially advantageous for the switch-over valve USV1 and the switch-over valve USV2 to be triggered at instants that are staggered in time for comfort reasons.

If the threshold value S1 is undershot in the query 310, then the pump motor is brought to its switched-off state, the aspirator valves ASV are so triggered that they close, and the switch-over valves USV are so triggered that they enable flow-through. It is especially advantageous for this query 310 to be encumbered with a hysteresis. This means that the threshold value S1 assumes two values. The threshold value at which the pump motor is switched on is greater than the value at which the pump motor is switched off.

In a second specific embodiment, it is provided for the procedure for building up pressure to be comparable to that in the first specific embodiment. In contrast to the first specific embodiment, the return pump is not switched off during the sustain-pressure state and during the reduce-pressure state. Accordingly, the aspirator valves ASV also remain in their open position.

The sustain-pressure and reduce-pressure states are realized solely by triggering the switch-over valves USV. These states can be realized by selecting the pulse duty factor for triggering the switch-over valves USV. By prolonging the times within which the switch-over valve USV enables flow-through, the sustain-pressure or reduce-pressure state can be attained.

In a third specific embodiment, the procedure is as follows. To realize a build-up of pressure, one proceeds comparably to the specific embodiment 1. The pump motor thereby drives the return pump in accordance with the driver's wish or in accordance with the booster characteristic curve shown in FIG. 4 so as to allow it to attain a specific nominal speed. It is especially advantageous for the pump motor to be controlled to a specifiable nominal speed. The aspirator valves are so triggered that they open. The switch-over valves USF are so triggered that they close.

The pressure build-up state differs here from the first specific embodiment in that the return pump is driven in dependence upon the driver's wish; by this means, different booster characteristic curves or different pedal characteristics can be realized.

In the pressure-sustaining state, the return pump is switched off, and the switch-over valves USV are so triggered that they close. The aspirator valves ASV are so triggered that they open. In so doing, the return pump 25 or 25' must be designed so as not to allow any flow from the wheel brake cylinders via the inlet valves, the return pump, and the aspirator valves ASV.

To decrease the pressure in the wheel brake cylinder, one proceeds as follows. The aspirator valves ASV are so triggered that they close, and the triggering of the switch-over valves USV follows accordingly. At the same time, the inlet valves EV are so triggered that they likewise close. The triggering of the outlet valves AV takes place in a fixed (timed) cycle, so that the decrease in pressure follows a specifiable characteristic curve. Thus, the return pump 20, 25' siphons off brake fluid from the wheel brake cylinders via the outlet valves AV and, therefore, effects a decrease in pressure in dependence upon the pulse duty factor. When the threshold S1 is undershot, the valves are again restored to their original state. It is particularly advantageous when a hysteresis is provided. This means that the threshold value S1 assumes two values. The threshold value at which the valves are triggered in the sense of a pressure build-up is higher than the value at which the valves are restored to their original state.

Various specific embodiments for recognizing whether one desires to build up, decrease, or sustain pressure, as well as the specific embodiments, such as the sustain-pressure, decrease-pressure states to be realized, may be combined with one another as needed. Accordingly, the various specific embodiments for realizing the sustain-pressure, decrease-pressure, and increase-pressure states may also be combined with one another.

With the device according to the present invention, the advantage is attained of being able to do without the vacuum booster. This offers considerable cost advantages. Furthermore, the space for the vacuum booster can be economized. An advantage in terms of safety is achieved with the device according to the present invention, since a defect is reliably detected, and when vapor bubbles occur, an active decrease in pressure to eliminate such bubbles follows automatically. Furthermore, it is possible to achieve different braking forces between the front and rear axle for vehicles having dual-circuit braking systems.

It is especially advantageous when the procedure according to the present invention is used to support the conventional power brake unit. It is particularly advantageous when pressure is built up additionally in the wheel brake cylinders using the above procedure in specific operating states.

Thus, it is particularly advantageous when the ratio PHZ/PRZ, which corresponds to the ascent of the characteristic curve in FIG. 4, can be specified in dependence upon specific operating states. For example, it is possible, when the driver's wish "panic braking" is detected, to implement an additional increase in braking force, in addition to the vacuum brake booster, and to build up pressure actively in the wheel brake cylinders. Preferably this takes place until the ABS control sets in on all wheels. By this means, a shortening of the braking distance can be achieved in critical traffic situations and in the event of inadequate force exerted by the driver on the pedal. One can proceed accordingly when an easing off in the coefficient of friction between the brake linings and the brake discs is detected, which is described as brake fade.

Figure 5:
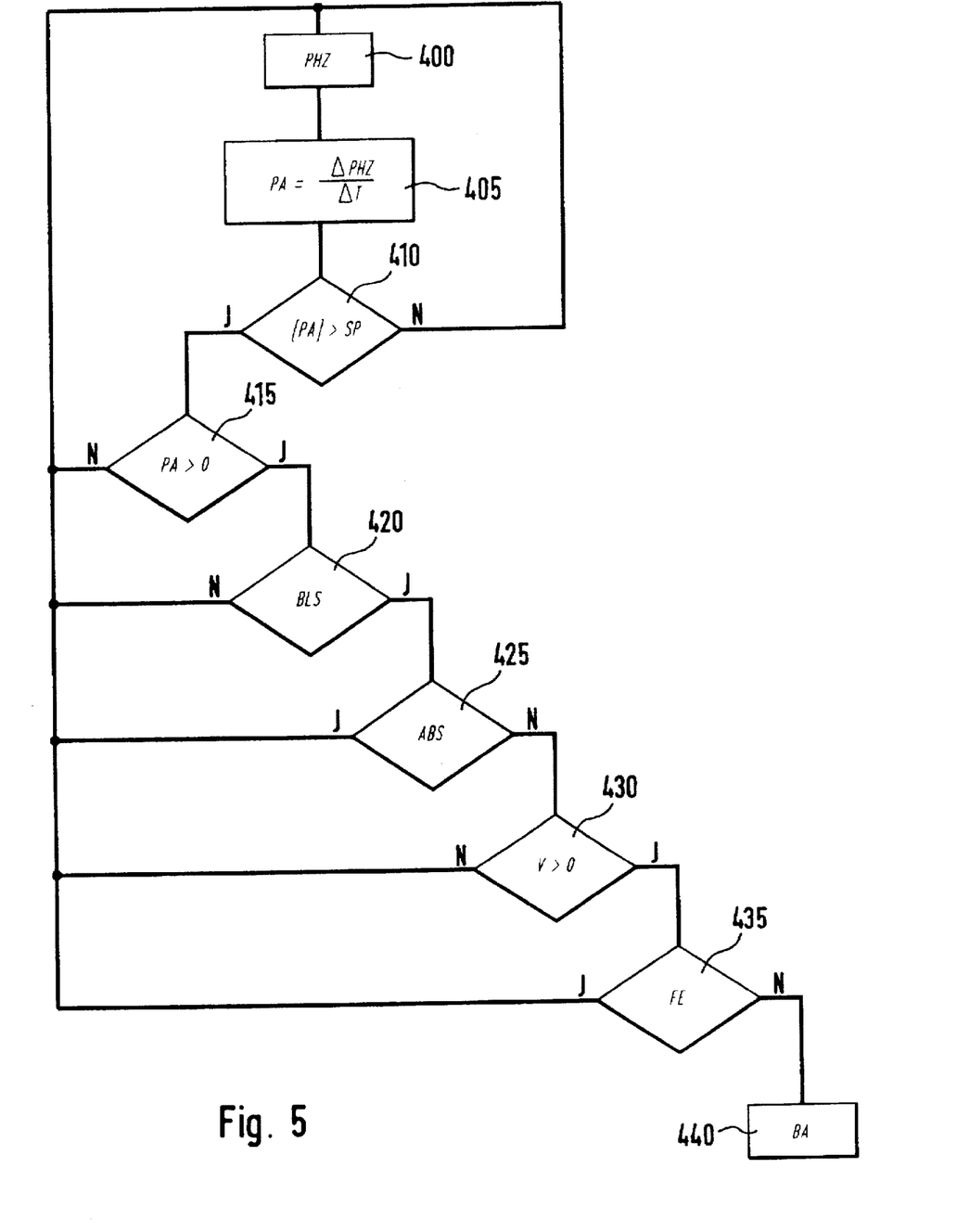
FIG. 5 shows a flow chart for detecting a panic-type braking.

An operating state, which can be described as "panic braking", is able to be detected, as depicted in FIG. 5. In a first step 400, the sensor 70 detects the pressure PHZ in the master brake cylinder. The subsequent step 405 determines the change in pressure PA comparably to step 320 in FIG. 3.

The query 410 checks whether the amount of the change in pressure PA is greater than a threshold value SP. If this is not the case, then step 400 follows. If the amount of the change in pressure PA is greater than the threshold value SP, then the query 415 checks whether the change PA is positive, i.e., that the pressure is rising. If this is not the case, then step 400 follows.

One especially advantageous further development of the present invention is attained in that another query corresponding to query 310 follows query 405 or query 410. This means a panic braking is not recognized until the actuation of the brake pedal exceeds a specifiable measure.

In the case of a specifiable rise in pressure, various plausibility queries still follow, which are not all absolutely necessary. The query 420 checks whether the brake lights switch 50 has been actuated; and the query 425 checks whether the ABS control is active. The query 430 recognizes whether the velocity V of the vehicle is greater than zero or than a threshold value. The query 435 checks whether the ABS system is working properly, i.e., that no error signal FE exists. If these conditions are all fulfilled, the so-called braking assistant is activated in step 440. In the case that one of the conditions does not exist, then step 400 follows.

Figure 6:
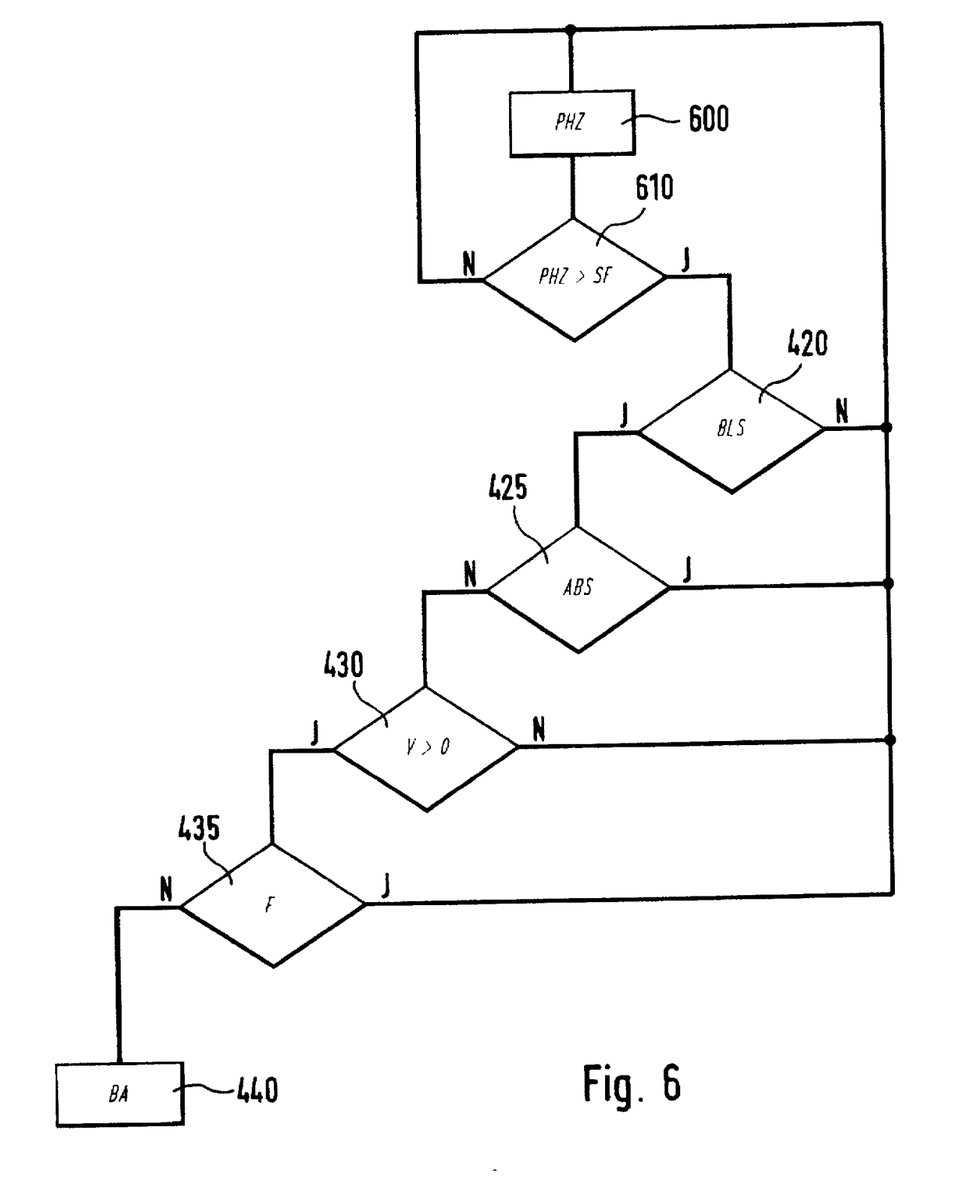
FIG. 6 shows a flow chart for recognizing brake fade (loss of friction due to overheating).

The operating state described as brake fade is able to be detected, as shown in FIG. 6. In a first step 600, the sensor 70 detects the pressure PHZ in the master brake cylinder.

The query 610 checks whether the pressure PHZ is greater than a threshold value SF. If this is not the case, then step 600 follows. The threshold value SF corresponds to a pressure in the master brake cylinder, which under normal conditions, i.e., given a dry, skid-resistant road surface, leads to an ABS control.

Various plausibility queries follow subsequently. The query 420 checks whether there is an actuation of the brake lights switch 50; the query 425 checks whether the ABS control is active. The query 430 checks whether the velocity V of the vehicle is greater than zero or than a threshold value. The query 435 detects whether the ABS system is working properly, i.e., that no error signal FE exists. If these conditions are all fulfilled, the so-called braking assistant is activated in step 440. It is especially advantageous when a warning device is additionally activated to indicate the brake fade to the driver. If one of the conditions does not exist, then step 600 follows.

If brake fade is recognized, then the pressure in the wheel brake cylinder is increased. The pressure PRZ in the wheel brake cylinder is preferably increased gradually (step by step) until the ABS control sets in on all wheels, or until a maximum, permissible, specifiable pressure difference is reached between the pressure in the wheel brake cylinder and the pressure in the master brake cylinder.

Figure 7:
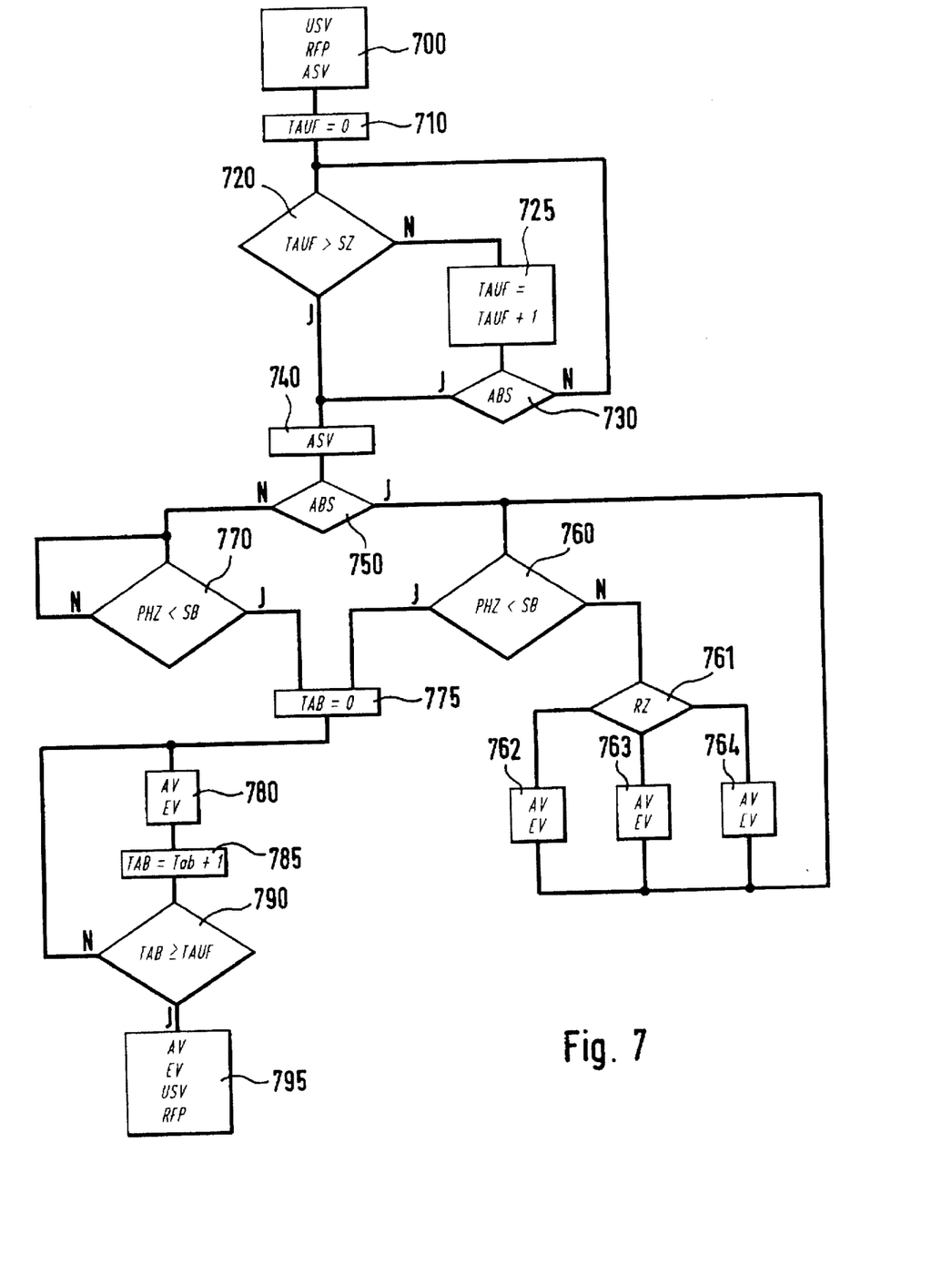
FIG. 7 shows a flow chart for clarifying the reaction to a special operating state.

The braking assistant, which is activated in step 440, can be realized, for example, as depicted in the flow chart in accordance with FIG. 7. In step 700, the return pump 25, the switch-over valves USV, and the aspirator valves ASV are triggered in the sense of a pressure increase. This takes place, for example, in that the switch-over valves USV are closed and the aspirator valve is open, and the return pump is put into operation.

A time meter TAUF is subsequently set to zero in step 710. This meter determines the time span within which a pressure build-up takes place. The subsequent query 720 checks whether the time duration TAUF of the pressure build-up exceeds a specifiable threshold value SZ. If this is not the case, then step 725 follows. The meter TAUF runs up in this step. This means it runs up by a fixed amount which corresponds to the time span of a program cycle or of the time duration of a pressure build-up.

The query 730 subsequently checks whether the ABS control has become active. If this is not the case, then step 725 follows. If the query 720 detects that the time threshold SZ has been exceeded, or if the query 730 detected that the ABS control is active, then the aspirator valves ASV are so triggered in step 740 that they close.

The query 750 subsequently checks whether the ABS control has become active. If this is the case, then the query 760 interrogates whether the pressure PHZ in the master brake cylinder has dropped below a threshold value SB. This query detects that the driver is no longer actuating the gas pedal or that the driver is actuating the brake pedal with clearly less force. This means that the driver desires a clearly smaller braking force, which results in a diminished pressure in the master brake cylinder. If this is not the case, then the ABS control is introduced. In dependence upon the result of the query 761, the outlet valves AV and the inlet valves EV are so triggered that the pressure in the wheel brake cylinder is, in step 762, decreased, in step 763 sustained, and in step 764 built up.

If the query 750 detects that the ABS control has not become active, then the query 770 follows. Comparably to the query 760, this query checks whether the pressure PHZ in the master brake cylinder has dropped below a threshold value SB. If one of the queries 770 or 760 detects that the driver is no longer actuating the gas pedal, then step 775 follows, in which the meter TAB, which counts the time for pressure reduction, is set to zero.

The reduction in pressure in the wheel brake cylinders follows in the subsequent step 780. To this end, the outlet valves AV are so triggered that they open, and the inlet valves EV are so triggered that they close. The meter TAB is subsequently increased in step 785 by a value which corresponds to the time interval of the pressure reduction produced by the triggering in step 780. The subsequent query 790 checks whether the time duration TAB is greater than the time duration TAUF. If this is not the case, then a further pressure reduction follows in step 780.

If the time duration TAB is greater than the time duration TAUF, this means the pressure increased in the pressure build-up phase in the wheel brake cylinders is again reduced; then step 795 follows. The original state prior to the pressure increase is established through corresponding triggering of the outlet valves, of the inlet valves, of the switch-over valves and of the return pump 25.

One especially advantageous further development of the present invention provides for it to be checked prior to the query 790 whether the driver is again actuating the brake pedal more heavily, i.e., it is checked, for example, whether the pressure PHZ is greater than a specifiable threshold value. If this is the case, i.e., the driver again desires a higher brake pressure, then the program continues directly with step 795.

Another further development of the present invention lies in checking during the course of the pressure build-up whether the driver desires a lesser braking force. This can be realized, for example, in that a further pressure build-up first takes place when subsequent to block 725 or query 730, a query follows that corresponds to the queries 770 or 760. If this query recognizes that the driver desires a clearly smaller braking force, then the aspirator valve ASV is so triggered that it closes. Step 775 follows subsequently.

Figure 8:
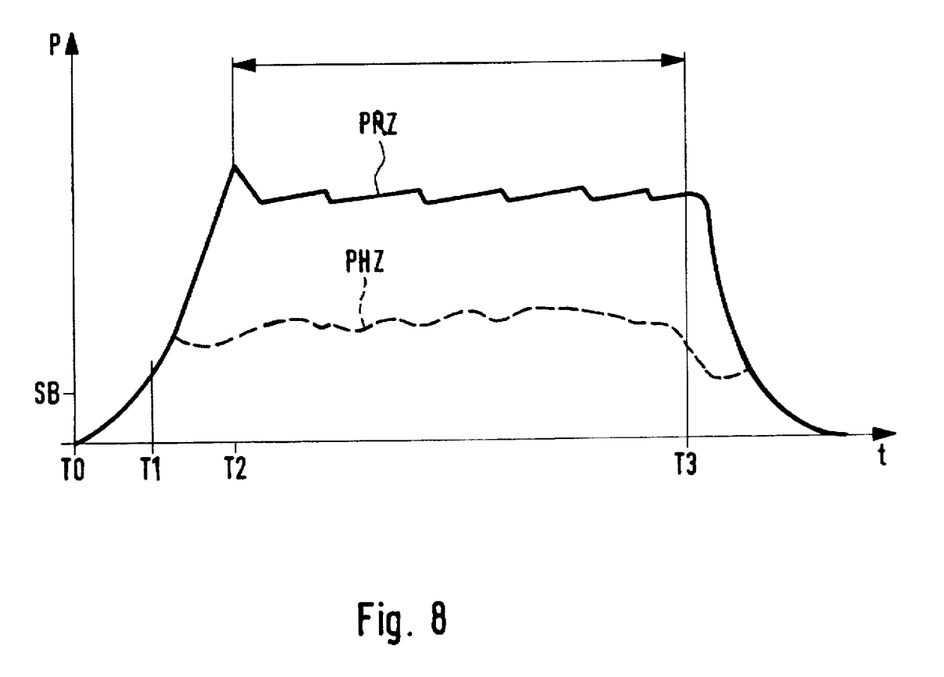
FIG. 8 shows various signals plotted over time.

A procedure of this type enables a characteristic pressure curve to be achieved, as shown in FIG. 8. The pressure PRZ prevailing in the wheel brake cylinders and the pressure PHZ prevailing in the master brake cylinder are plotted over the time t. At the instant T0, the driver actuates the brake. This causes the pressure to rise in the wheel brake cylinder and in the master brake cylinder. At the instant T1, the change PA in the pressure PHZ exceeds its threshold value. The pressure PRZ rises again. The pressure PHZ only rises to a low value. The ABS control becomes active at the instant T2. At the instant T3, the pressure PHZ in the master brake cylinder falls below its threshold value SB, which indicates that the driver is no longer actuating the brake or desires a clearly smaller braking force. From this instant on, the pressure PRZ drops to zero. The ABS control is active during the time period between T2 and T3.

Because the switch-over valves USV are not opened until the pressure in the wheel brake cylinders is reduced to the value of the pressure in the master brake cylinder, an effect on the brake pedal can be prevented.

The additional braking force for a panic braking or for a detected brake fade can be achieved without additional hardware components. Therefore, this procedure is very cost-effective and does not require any additional installation space. Furthermore, one can achieve higher braking pressures than are possible with a vacuum brake booster.

What is claimed is:

1. A method for controlling at least one of an ABS antilock braking system and an ASR traction control system including at least one return pump, at least one aspirator valve, and at least one switch-over valve, comprising the steps of:

generating a signal representing an actuation of a brake pedal;

specifying as a function of the signal at least one of a pressure build-up state in which pressure in a wheel brake cylinder is built up, a pressure-reduction state in which pressure in a wheel brake cylinder is reduced, and a sustain-pressure state in which pressure in a wheel brake cylinder is sustained, wherein the pressure build-up state is specified when at least one of a positive change in the signal exists and a special operating state is recognized, the special operating state being recognized when at least one further plausibility condition is fulfilled, and at least one of a value of the signal is greater than a first threshold value and a change in the value of the signal is greater than a second threshold value; and triggering at least one of the return pump, the aspirator valve, and the switch-over valve as a function of the specified state.

2. The method according to claim 1, wherein the signal is generated by a sensor, and the signal indicates at least one of a travel of the brake pedal, a speed of the brake pedal, and a pressure in a master brake cylinder.

3. The method according to claim 1, wherein the least one of the ABS antilock braking system and the ASR traction control system further include an outlet valve, and further comprising the step of triggering the outlet valve in a fixed cycle in at least one of the pressure-reduction state and the sustain pressure state.

4. The method according to claim 2, wherein the pressure build-up state is further specified when at least one of a pressure in a master brake cylinder and a change in pressure in the master brake cylinder exceeds a threshold value.

5. The method according to claim 2, wherein the pressure build-up state is further specified when a pressure in the master brake cylinder and a pressure in a wheel brake cylinder have implausible values.

6. The method according to claim 1, further comprising, in the sustain-pressure state:

triggering the aspirator valve into a closed state;

triggering the switch-over valve into a closed state; and triggering the return pump into a non-delivery state.

7. The method according to claim 1, further comprising the step of triggering the switch-over valve in a fixed cycle in at least one of the pressure-reduction state and the sustain-pressure state.

8. The method according to claim 1, further comprising, in the pressure build-up state:

triggering the aspirator valve into an opened state;

triggering the switch-over valve into a closed state; and triggering the return pump into a delivery state.

9. A device for controlling at least one of an ABS antilock braking system and an ASR traction control system including at least one return pump, at least one aspirator valve, and at least one switch-over valve, comprising:

means for generating a signal representing an actuation of a brake pedal;

means for specifying as a function of the signal at least one of a pressure build-up state in which pressure in a wheel brake cylinder is built up, a pressure-reduction state in which pressure in a wheel brake cylinder is reduced, and a sustain-pressure state in which pressure in a wheel brake cylinder is sustained, wherein the pressure build-up state is specified when at least one of a positive change in the signal exists and a special operating state is recognized, the special operating state being recognized when at least one further plausibility condition is fulfilled and one of a value of the signal is greater than a first threshold value and a change in the value of the signal is greater than a second threshold value; and means for triggering at least one of the return pump, the aspirator valve, and the switch-over valve as a function of the specified state.

* * * * *